United States Patent
Tung et al.

(10) Patent No.: US 10,635,484 B2
(45) Date of Patent: Apr. 28, 2020

(54) DEVICE AND METHOD FOR DYNAMICALLY ADJUSTING TASK LOADING OF MULTI-CORE PROCESSOR

(71) Applicant: MStar Semiconductor, Inc., Hsinchu Hsien (TW)

(72) Inventors: Yi-Shin Tung, Hsinchu Hsien (TW); Tse-Tsung Shih, Hsinchu Hsien (TW); Tzu-Jung Huang, Hsinchu Hsien (TW)

(73) Assignee: MEDIATEK INC., Hsinchu (TW)

( * ) Notice: Subject to any disclaimer, the term of this patent is extended or adjusted under 35 U.S.C. 154(b) by 121 days.

(21) Appl. No.: 15/831,655

(22) Filed: Dec. 5, 2017

(65) Prior Publication Data

US 2018/0157527 A1    Jun. 7, 2018

Related U.S. Application Data

(60) Provisional application No. 62/430,943, filed on Dec. 7, 2016.

(51) Int. Cl.
| | |
|---|---|
| *G06F 9/46* | (2006.01) |
| *G06F 9/48* | (2006.01) |
| *G06F 9/50* | (2006.01) |
| *G06F 15/80* | (2006.01) |

(52) U.S. Cl.
CPC .......... *G06F 9/4881* (2013.01); *G06F 9/5038* (2013.01); *G06F 9/5088* (2013.01); *G06F 15/80* (2013.01); *Y02D 10/32* (2018.01)

(58) Field of Classification Search
None
See application file for complete search history.

(56) References Cited

U.S. PATENT DOCUMENTS

| | | | | |
|---|---|---|---|---|
| 2015/0040136 | A1* | 2/2015 | Matthes | G06F 9/5094 718/104 |
| 2016/0139964 | A1* | 5/2016 | Chen | G06F 1/3206 718/104 |
| 2016/0327999 | A1* | 11/2016 | Chang | G06F 1/3296 |

FOREIGN PATENT DOCUMENTS

TW        201527950 A        7/2015

OTHER PUBLICATIONS

Lukefahr et al., "Composite Cores: Pushing Heterogeneity into a Core", 2012. IEEE, pp. 317-328. (Year: 2012).*

* cited by examiner

*Primary Examiner* — Kenneth Tang
(74) *Attorney, Agent, or Firm* — McClure, Qualey & Rodack, LLP

(57) ABSTRACT

A multi-core processing device includes a first processor core and a second processor core. The computation capability of the second processor core is greater than that of the first processor core. When loading of a task is lower than an hmp_down_migration threshold, the multi-core processing device allocates the task to the first processor core. When the loading of a task is higher than an hmp_up_migration threshold, the multi-core processing device allocates the task to the second processor core. At least one of the hmp_down_threshold and the hmp_up_threshold changes from a first value to a second value during a run time of the multi-core processing device.

20 Claims, 9 Drawing Sheets

DEVICE AND METHOD FOR DYNAMICALLY ADJUSTING TASK LOADING OF MULTI-CORE PROCESSOR

This application claims the benefit of U.S. Provisional Application Ser. No. 62/430,943, filed Dec. 7, 2016, the subject matter of which is incorporated herein by reference.

BACKGROUND OF THE INVENTION

Field of the Invention

The invention relates in general to a multi-core processor, and more particularly to a device and method for allocating task loading of a multi-core processor.

Description of the Related Art

A heterogeneous multi-processing (HMP) architecture can use different types of processors for collaborative operations to achieve an overall computation task. ARM big-.LITTLE is an example using a heterogeneous multi-processing architecture. In general, if a task to be executed requires large amounts of computation, the task is more suitably executed by a big core. However, for a common logic computation task, or a general task executed in the background, the task is suitably executed by a little core. A big core has higher performance but is more power consuming, whereas a little core has lower performance but is more power saving. For different applications and different overall resources, a conventional task loading allocation may not entirely satisfy various different requirements. In certain situations, a user needs high performance over being power saving; in other situations, a user needs to be power saving over high performance. Therefore, there is a need for a flexibly adjustable multi-core processor that attends to various needs.

SUMMARY OF THE INVENTION

It is an object of the present invention to provide a multi-core processing device and a method for allocating task loading, so as to adaptively adjust task loading between processor cores and to provide more flexible task loading allocation.

It is another object of the present invention to provide a multi-core processing device and a method for allocating task loading, so as to allow the multi-core processing device to allocate a task according to target task loading to individual processor cores.

A multi-core processing device is provided according to an embodiment of the present invention. The multi-core processing device includes a first processor core and a second processor core. The computation capability of the second processor core is greater than that of the first processor core. When a difference between current task loading of the first processor core and target task loading of the first processor core is greater than a tolerable error, the multi-core processing device adjusts one of an hmp_up_migration threshold and an hmp_down_migration threshold.

A multi-core processing device is provided according to an embodiment of the present invention. The multi-core processing device includes a first processor core and a second processor core. The computation capability of the second processor core is greater than that of the first processor core. When loading of a task is lower than an hmp_down_migration threshold, the multi-core processing device relocates the task from the second processor core to the first processor core. When loading of the task is higher than an hmp_up_migration threshold, the multi-core processing device relocates the task from the first processor core to the second processor core. At least one of the hmp_down_migration threshold and the hmp_up_migration threshold changes from a first value to a second value during a run time of the multi-core processing device. The run time refers a period in which total task loading of the multi-core processing device at any time point is non-zero and the multi-core processing device is operating to process the oading.

A method for dynamically adjusting task loading of a multi-core processing device is provided according to another embodiment of the present invention. The multi-core processing device includes a first processor core and a second processor core. The computation capability of the second processor core is greater than that of the first processor core. The method includes steps of: providing target task loading of the first processor core; determining a difference between target task loading of the first processor core and current task loading of the first processor core; when the difference is smaller than a tolerable error, changing neither of an hmp_up_migration threshold and an hmp_down_migration threshold; and when the difference is greater than the tolerable error, changing one of the hmp_up_migration threshold and the hmp_down_migration threshold.

A method for dynamically adjusting task loading of a multi-core processing device is provided according to another embodiment of the present invention. The multi-core processing device includes a first processor core and a second processor core. The computation capability of the second processor core is greater than that of the first processor core. The method includes steps of: when loading of a task is lower than an hmp_down_migration threshold, relocating the task from the second processor core to the first processor core; when loading of the task is higher than an hmp_up_migration threshold, relocating the task from the first processor core to the second processor core; and changing at least one of the hmp_down_migration threshold and the hmp_up_migration threshold from a first value to a second value during a run time of the multi-core processing device.

The above and other aspects of the invention will become better understood with regard to the following detailed description of the preferred but non-limiting embodiments. The following description is made with reference to the accompanying drawings.

DETAILED DESCRIPTION OF THE INVENTION

A system may be a multi-core processing device, which may include multiple processor cores having different computation capabilities. In some embodiments, a multi-core processing device includes a first processor core cluster and a second processor core cluster. The first processor core cluster may include multiple identical first processor cores, and the second processor core cluster may include multiple identical second processor cores. The computation capability of each of the second processor cores is greater than the computation capability of each of the first processor cores. The second processor core having the greater computation capability may be referred to as a big core, whereas the first processor core may be referred to as a little core. A big core has higher performance but is more power consuming; a little core has lower performance but is more power saving.

Figure 1:
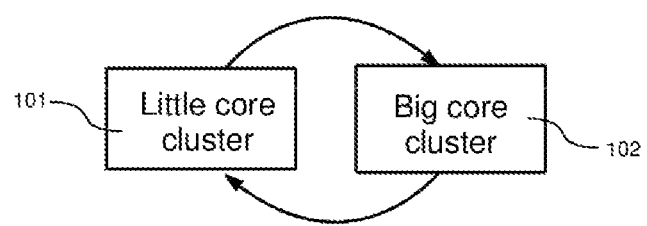
FIG. 1 is a schematic diagram of global task scheduling of a multi-core processor architecture.

FIG. 1 shows a schematic diagram of global task scheduling of a multi-core processor architecture. Referring to FIG. 1, if loading of a task exceeds an hmp_up_migration threshold, the task is switched to and executed by a big core or a big core cluster 102. If loading of this task is lower than an hmp_down_migration threshold, the task is switched to and executed by a little core or a little core cluster 101. The hmp_up_migration threshold is usually larger than the hmp_down_migration threshold. If a system includes only one migration threshold serving as a determination basis for switching between big and little cores, frequent and unnecessary switching may be caused when loading of a task fluctuates about this migration threshold. Using dual thresholds as a determination basis for switching, the drawback of the above single value can be prevented while performance can be enhanced.

Figure 2:
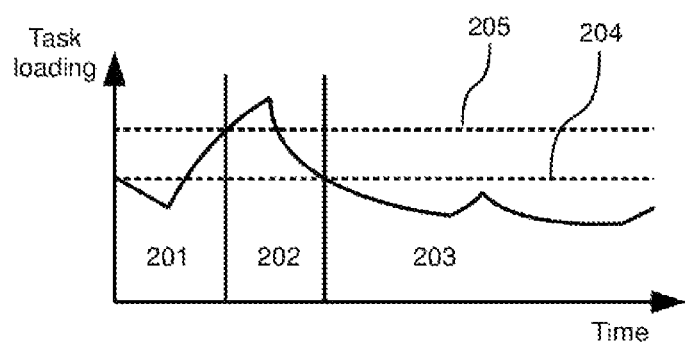
FIG. 2 shows the progressing of task loading migration under a static migration threshold.

FIG. 2 shows the progressing of loading migration under a static migration threshold. Referring to FIG. 2, the global task scheduling of a system provides a static migration threshold; that is, the migration threshold stays constant under different applications or during a process of different overall resources. In this embodiment, there are a total of two static migration thresholds, including an hmp_down_migration threshold 204 and an hmp_up_migration threshold 205. Referring to FIG. 2, in an interval 201, when the task loading does not exceed the hmp_up_migration threshold 205, the task loading is handled by a small core cluster. In an interval 202, when the task loading exceeds the hmp_up_migration threshold but is not as low as the hmp_down_migration threshold 204, the loading of a newly added task is handled by a big core cluster. In an interval 203, the task loading reduces to below the hmp_down_migration threshold 204, and the loading of a newly added task at this point is handled by a small core cluster.

Figure 3A:
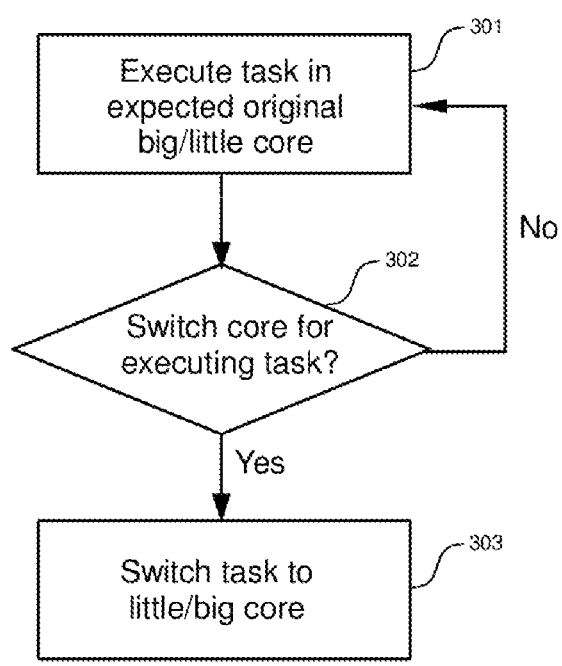
FIG. 3A is a flowchart of statically adjusting a migration threshold.

FIG. 3A shows a flowchart of statically adjusting a migration threshold. Referring to FIG. 3A, the loading of a newly added task is predetermined to be executed by a certain processor core, which may be a big core or a little core (represented by big/little core herein) (step 301). It is determined whether task loading migration is to be performed (step 302). In step 302, if the newly task is intended to be executed by a big core, the system determines whether the task loading is lower than the hmp_down_migration threshold. If so, the loading of the newly added is allocated to a little core. If not, the newly added task is executed by the original big core. Thus, step 302 leads to two results—switching and not switching. If the result is not switching, the newly added task is executed by the original big/little core. If the result is switching, the newly added task is switched to and executed by another core (step 303). The another core switched to may be represented by a little/big core.

Figure 3B:
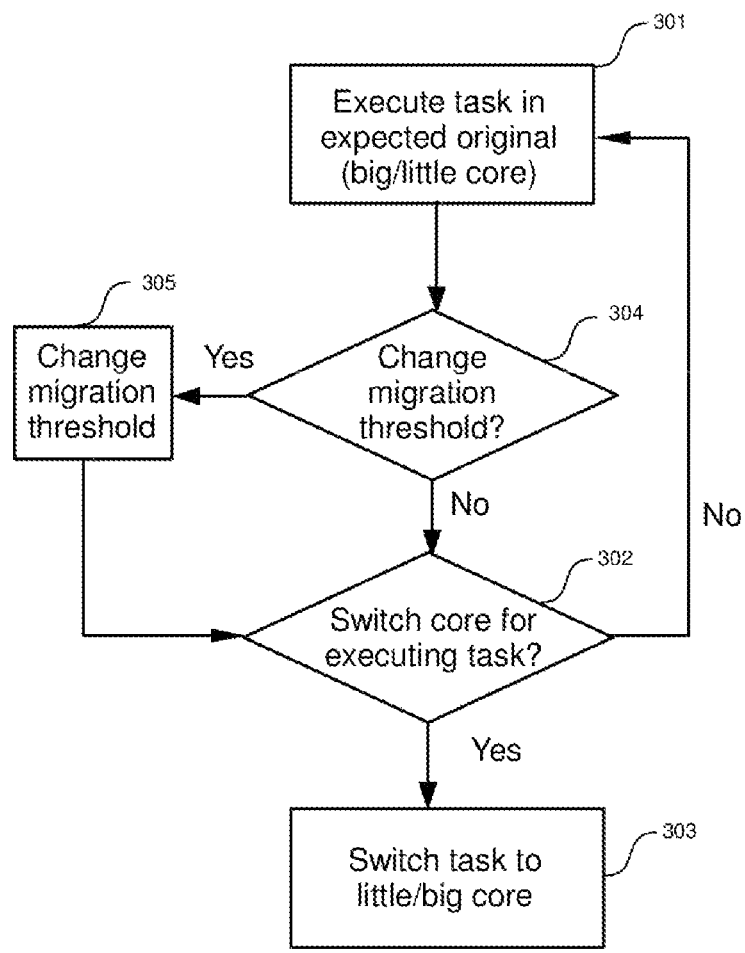
FIG. 3B is a flowchart of dynamically adjusting a migration threshold according to an embodiment.

However, a static migration threshold is not an optimal method, and conditions of total task loading are not considered. In contrast, dynamically adjusting a migration threshold can reduce power consumption and enhance performance. FIG. 3B shows a flowchart of dynamically adjusting a migration threshold according to an embodiment. Compared to FIG. 3A, FIG. 3B further includes steps of adjusting a migration threshold (step 304 and step 305). In some embodiments, there are two migration thresholds, including an hmp_down_migration threshold and an hmp_up_migration threshold. In step 304, the system determines whether a migration threshold needs to be changed. If a difference between current task loading and target task loading is within a tolerable error, it is determined that no change is needed. If the difference between the current task loading and the target task loading exceeds the tolerable error, it is determined that migration threshold needs to be changed. Step 302 is performed if no change is needed, otherwise step 305 is performed if change is needed. Step 302 is performed after changing the migration threshold in step 305 to determine whether switching of a core is needed.

Figure 4:
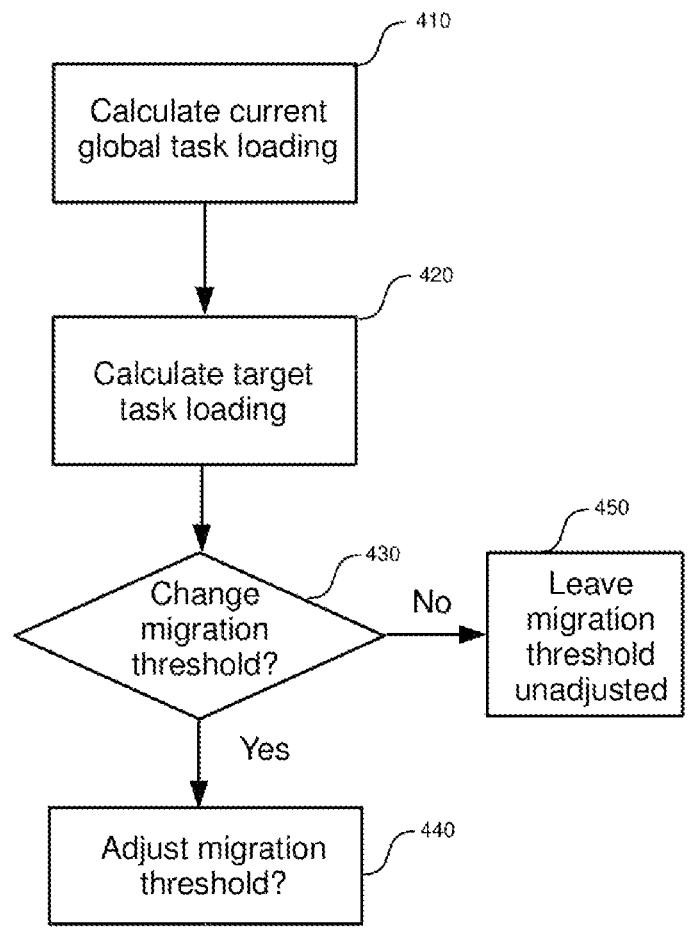
FIG. 4 is a flowchart of how to achieve dynamically adjusting a migration threshold.

FIG. 4 shows a flowchart of how to achieve dynamically adjusting a migration threshold. Referring to FIG. 4, current total loading is calculated (step 410). The current totoal loading is, current total loading=(loading of all processor cores in the little cluster)+(loading of all processor cores in the big core cluster)*X, where X indicates that the computation capability of a processor core in the big core cluster is X times of that of a processor core in the little core cluster. An index of the computation capability may be Dhrystone million instructions executed per second (DMIPS).

If the system includes one big core cluster and one little cluster, the maximum total loading is (N+M*X)*100, wherein the little core cluster has N processor cores, the big core cluster has M processor cores, and 100 represents a loading level when a processor core in the little core cluster operates at a full capacity. Next, target task loading is calculated (step 420).

In other words, step 420 is calculation for an optimal task allocation, which may be planned in advance according to system resources and applications. In some embodiments, the optimal task allocation can be realized by a look-up table (LUT). Implementation details of step 420 are described below.

Figure 5:
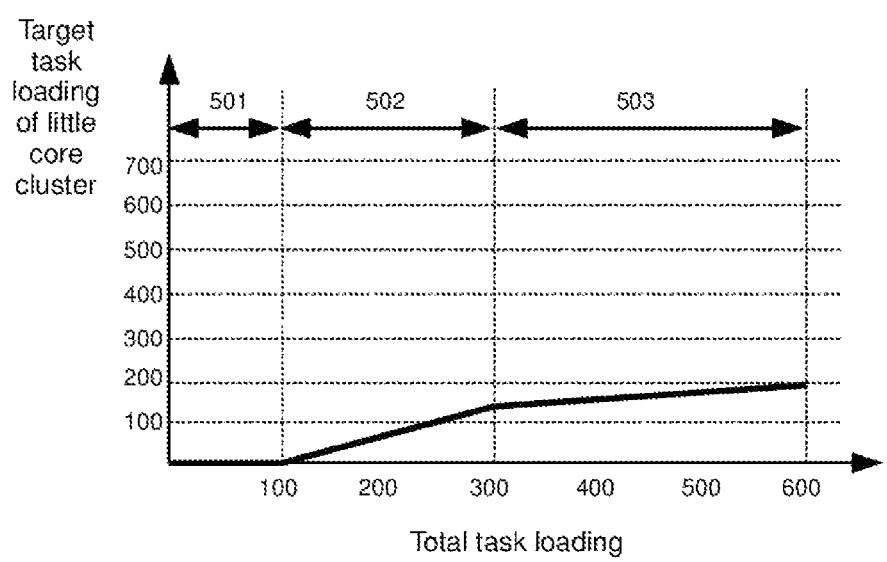
FIG. 5 shows an optimal task allocation curve according to an embodiment.

In some embodiments, the optimal task allocation can be represented by a curve. FIG. 5 shows an optimal task allocation curve according to an embodiment. Referring to FIG. 5, the horizontal axis represents current total loading, and the vertical axis represents target task loading of a little core cluster. In this embodiment, the curve is formed by multiple straight line segments; in other embodiments, the curve may be formed by multiple monotonic ascending curves. Assuming M=2, N=2 and X=2, the maximum total task loading is 600. As shown in FIG. 5, when the current total loading gradually rises from 0 to 600, the task allocation of the little core cluster progresses from a first phase 501 to a second phase 502 and then to a third phase 503. In the first phase 501, the slope of a first line segment is 0, and all task loading is executed by the big core cluster. In the second phase 502, a part of the task loading is gradually allocated to the little core cluster. In the third phase 503, task loading on both the big core cluster and the little core cluster continues increasing, until upper performance limits of the two clusters are reached.

Figure 6:
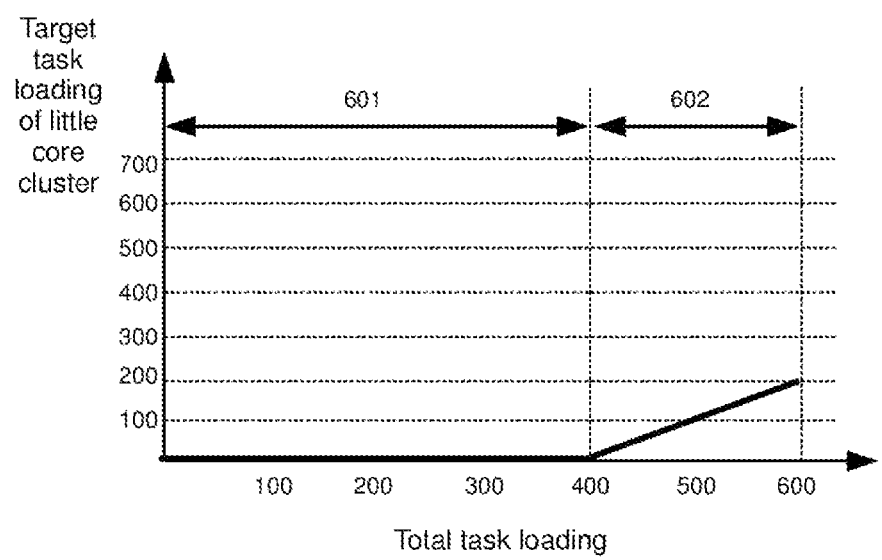
FIG. 6 shows a performance prioritized task allocation curve.

If the goal is high performance, the optimal approach is allocating all task loading to the big core cluster. FIG. 6 shows a task allocation curve when performance is prioritized. FIG. 6 includes only two straight line segments. In a first phase 601, the slope of the first line segment is 0, which means that all tasks are executed by the big core cluster. When the current total task loading reaches 400, the upper performance limit of the big core cluster is reached. If there are more new tasks at this point, these extra tasks are allocated to the little core cluster until the upper performance limit of the little core cluster is also reached. Referring to FIG. 6, in this embodiment, the slope of the second line segment is 1, which means that the extra tasks are allocated to the little core cluster because the upper performance limit of the big core cluster is reached.

Figure 7:
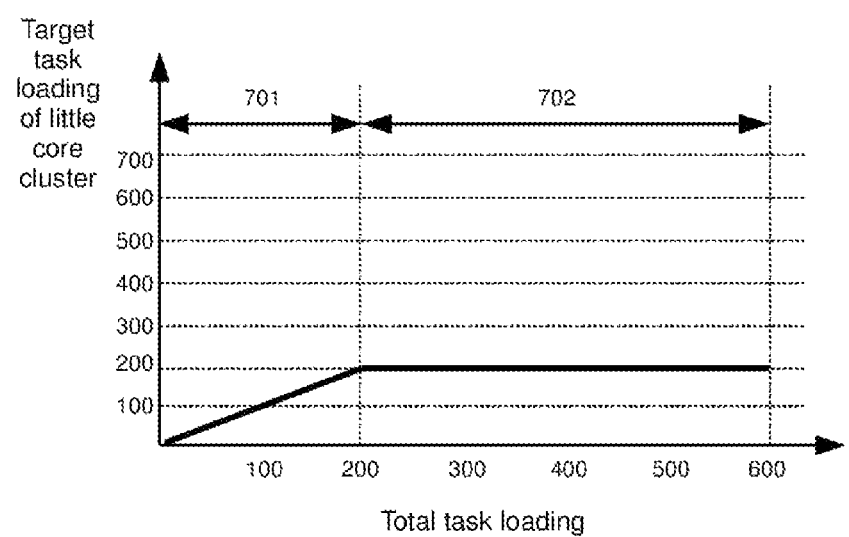
FIG. 7 shows a power-saving prioritized task allocation curve.

If the goal is power saving, an optimal approach is allocating all tasks to the little core cluster. FIG. 7 shows a task allocation curve when power saving is prioritized. Referring to FIG. 7, in a first phase 701, the slope of the first line segment is 1, which means that all newly added tasks are allocated to the little core cluster. When the current total task loading rises to 200, it means that the upper performance limit of the little core cluster is reached. If there are new tasks, these extra tasks can only be allocated to the big core cluster until the upper performance limit of the big core cluster is also reached. Referring to FIG. 7, in a second phase 702, the slope of the second line segment is 0, which means all new tasks are allocated to the big core cluster because the upper performance limit of the little core cluster is reached.

According to an embodiment of the present invention, a system may provide multiple different target task loading curves to select from. If the goal is high performance, the target task loading curve in FIG. 6 may be selected to determine dynamic task migration. In contrast, if the goal is low power consumption, the target task loading curve in FIG. 7 may be selected to determine dynamic task migration. Also referring to FIG. 4, in step 430, whether the current task loading condition matches expected target task loading can be determined. If the current task loading condition matches the expected target task loading, the hmp_up_migration threshold and the hmp_down_migration threshold are not changed. Conversely, if the target task loading condition does not match the expected target task loading, either the hmp_up_migration threshold or the hmp_down_migration threshold needs to be changed.

Referring to FIG. 4, in some embodiments, when the difference between the current task loading condition and the target task loading is within a tolerable error, it is considered that the target task loading is matched. In step 440, because the current task loading condition does not match the expected target task loading, the hmp_up_migration threshold and the hmp_down_migration threshold are changed. To change the hmp_up_migration threshold and the hmp_down_migration threshold, for example, the hmp_down_migration threshold is increased or the hmp_up_migration threshold is increased when the target task loading of the little core cluster is higher than the current task loading, such that the newly added task can be more likely allocated to the little core cluster.

Conversely, when the target task loading of the little core cluster is lower than the current task loading, the hmp_up_migration threshold is decreased or the hmp_down_migration threshold is decreased, such that the newly added task can be more likely allocated to the big core cluster. It should be noted that, the above determination method based on the difference between the target task loading of the little core cluster and the current task loading is merely an example.

In some embodiments, the target task loading curve of the big core cluster can be first provided, and the difference between the target task loading and the current task loading of the big core cluster is then determined. When the target task loading is higher than the current task loading and the difference is greater than a tolerable error, the hmp_up_migration threshold can be increased or the hmp_down_migration threshold can be increased, such that the newly added task loading can be more likely allocated to the small core cluster. When the target task loading is lower than the current task loading and the difference is greater than a tolerable error, the hmp_up_migration threshold can be decreased or the hmp_down_migration threshold can be decreased, such that the newly added task loading can be more likely allocated to the big core cluster.

In some embodiments, if the difference between the current task loading condition and the target task loading is large, the hmp_up_migration threshold or the hmp_down_migration threshold may be adjusted by a larger value. An embodiment of adjusting the hmp_up_migration threshold or the hmp_down_migration threshold is given below.

$$|\text{delta shreshold}| = \left| \frac{\text{current task loading} - \text{target task loading}}{\text{target task loading}} \right| * \text{Adjust factor}$$

In the above equation, "absolute delta threshold" is a value by which the hmp_up_migration threshold or the hmp_down_migration threshold is adjusted, "Adjust factor" is a factor associated with coarse tuning or fine tuning, "Current task loading" is the current task loading, and "Target task loading" the target task loading. It should be noted that, the above equation is an example, and there are other different equations for adjusting the hmp_up_migration threshold or the hmp_down_migration threshold.

Figure 8:
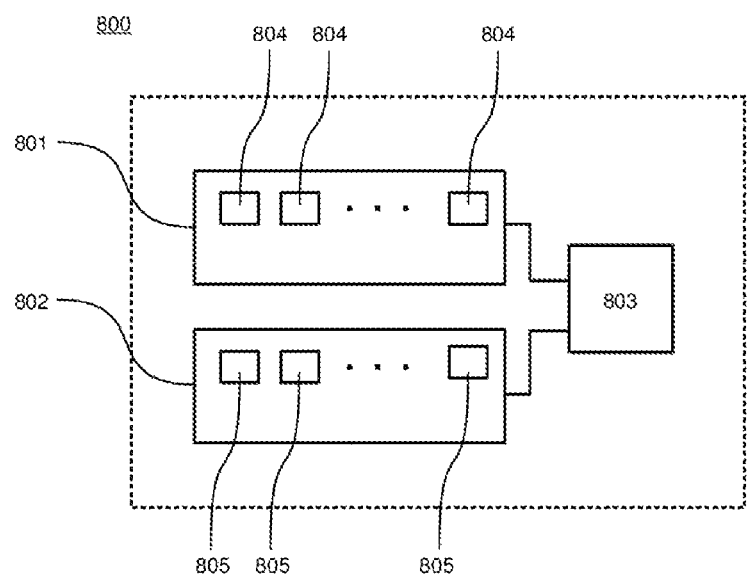
FIG. 8 is a multi-core processing device according to an embodiment.

FIG. 8 shows a multi-core processing device according to an embodiment. Referring to FIG. 8, a multi-core processing device 800 includes a first processor core cluster 801, a second processor core cluster 802, and a task loading allocating circuit 803. The first processor core cluster 801 includes multiple first processor cores 804. The second processor core cluster 802 includes multiple second processor cores 805. The computation capability of the second processor cores 805 is greater than that of the first processor cores 804. The task loading allocating circuit 803 determines whether a difference between current task loading of the first processor core cluster 801 and target task loading of the first processor core cluster 801 is greater than a tolerable error.

In some embodiments, the multi-core processing device 800 includes only one first processor core 804 and only one second processor core 805. At this point, the task loading allocating circuit 803 determines whether a difference between current task loading of the first processor core 804 and target task loading of the first processor core 804 is greater than a tolerable error. In some embodiment, the task loading allocating circuit 803 can also determine whether a difference between current task loading of the second processor core cluster 802 and target task loading of the second processor core 802 is greater than a tolerable error. In some embodiments, the task loading allocating circuit 803 may also determine whether a difference between current task loading of the second processor core 805 and target task loading of the second processor core 805 is greater than a tolerable error.

In some embodiments, the determining of the target task loading and the current task loading can be completed by the first processor core 804 and the second processor core 805. In this situation, the multi-core processing device 800 may not include the task loading allocating circuit 803.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-core processing device, having an hmp_up_migration threshold and an hmp_down_migration threshold, comprising:
    a first processor core; and
    a second processor core, having a computation capability greater than that of the first processor core;
    wherein, when a difference between current task loading of the first processor core and target task loading of the first processor core is greater than an error, the multi-core processing device adjusts one of the hmp_up_migration threshold and the hmp_down_migration threshold;
    wherein, the hmp_up_migration threshold is larger than the hmp_down_migration threshold.

2. The multi-core processing device according to claim 1, further comprising:
    a task loading allocating circuit, determining whether the difference between the current task loading of the first processor core and the target task loading of the first processor core is greater than the error.

3. The multi-core processing device according to claim 1, wherein the first processor core determines whether the difference between the current task loading of the first processor core and the target task loading of the first processor core is greater than the error.

4. The multi-core processing device according to claim 1, comprising:
    a first processor core cluster, to which the first processor core belongs, comprising a plurality of the first processor cores.

5. The multi-core processing device according to claim 1, comprising:
    a second processor core cluster, to which the second processor core belongs, comprising a plurality of the second processor cores.

6. The multi-core processing device according to claim 1, further comprising:
    a look-up table, storing the target task loading of the first processor core.

7. A multi-core processing device, comprising:
    a first processor core; and
    a second processor core, having a computation capability greater than that of the first processor core;
    wherein, when loading of a task is lower than an hmp_down_migration threshold, the multi-core processing device relocates the task from the second processor core to the first processor core; when the loading of the task is higher than an hmp_up_migration threshold, the multi-core processing device relocates the task from the first processor to the second processor;
    and at least one of the hmp_down_migration threshold and the hmp_up_migration threshold changes from a first value to a second value based on current task loading of the first processor core and target task loading of the first processor core during a run time of the multi-core processing device;
    wherein, the hmp_up_migration threshold is larger than the hmp_down_migration threshold.

8. The multi-core processing device according to claim 7, wherein when a difference between the current task loading of the first processor core and the target task loading of the first processor core is greater than an error, the multi-core processing device adjusts one of the hmp_down_migration threshold and the hmp_up_migration threshold.

9. The multi-core processing device according to claim 8, further comprising:
    a look-up table, storing the target task loading of the first processor core.

10. The multi-core processing device according to claim 7, comprising:
    a first processor core cluster, to which the first processor core belongs, comprising a plurality of the first processor cores.

11. The multi-core processing device according to claim 7, comprising:
    a second processor core cluster, to which the second processor core belongs, comprising a plurality of the second processor cores.

12. A method for dynamically adjusting task loading of a multi-core processing device, the multi-core processing device comprising a first processor core and a second processor core, a computation capability of the second processor core being greater than that of the first processor core; the method comprising:
    providing target task loading of the first processor core;
    determining a difference between the target task loading of the first processor core and current total task loading of the first processor core;
    determining whether the difference is greater than an error; and
    adjusting one of an hmp_up_migration threshold and an hmp_down_migration threshold according to the determination result;
    wherein, the hmp_up_migration threshold is larger than the hmp_down_migration threshold.

13. The method according to claim 12, wherein when the target task loading of the first processor core is higher than the current task loading of the first processor core and the difference is greater than the error, the hmp_down_migration threshold is increased.

14. The method according to claim 12, wherein when the target task loading of the first processor core is lower than the current task loading of the processor core and the difference is greater than the error, the hmp_down_migration threshold is decreased.

15. The method according to claim 12, further comprising:
    storing target task loading of the first processor by using a look-up table.

16. A method for dynamically adjusting task loading of a multi-core processing device, the multi-core processing device comprising a first processor core and a second processor core, a computation capability of the second processor core being greater than that of the first processor core; the method comprising:

when task loading is lower than an hmp_down_migration threshold, allocating a newly added task to the first processor core;

when the task loading is higher than an hmp_up_migration threshold, allocating the newly added task to the second processor core; and during a run time of the multi-core processing device, changing at least one of the hmp_down_migration threshold and the hmp_up_migration threshold from a first value to a second value based on current task loading of the first processor core and target task loading of the first processor core;

wherein, the hmp_up_migration threshold is larger than the hmp_down_migration threshold.

17. The method according to claim 16, wherein when the target task loading of the first processor core is higher than the current task loading of the first processor core and the difference is greater than an value, the hmp_down_migration threshold is increased.

18. The method according to claim 16, wherein when the target task loading of the first processor core is lower than the current task loading of the first processor core and the difference is greater than an value, the hmp_down_migration threshold is decreased.

19. The method according to claim 16, further comprising:

storing target task loading of the first processor core by using a look-up table.

20. A multi-core processing device, having an hmp_up_migration threshold and an hmp_down_migration threshold, comprising:

a first processor core; and a second processor core, having a computation capability greater than that of the first processor core;

wherein, when a difference between current total task loading of the second processor core and target task loading of the second processor core is greater than an error, the multi-core processing device adjusts one of the hmp_up_migration threshold and the hmp_down_migration threshold;

wherein, the hmp_up_migration threshold is larger than the hmp_down_migration threshold.

* * * * *